(12) United States Patent
Pusheck et al.

(10) Patent No.: US 11,919,532 B2
(45) Date of Patent: Mar. 5, 2024

(54) SYSTEM MATCHING DRIVER INTENT WITH FORWARD-REVERSE GEAR SETTING

(71) Applicant: Arriver Software LLC, Novi, MI (US)

(72) Inventors: Jacob Pusheck, Waterford, MI (US); Joshua Forwerck, Royal Oak, MI (US); Kristie Hargreaves, White Lake, MI (US)

(73) Assignee: Arriver Software LLC, Novi, MI (US)

( * ) Notice: Subject to any disclaimer, the term of this patent is extended or adjusted under 35 U.S.C. 154(b) by 163 days.

(21) Appl. No.: 17/620,614

(22) PCT Filed: Jun. 18, 2020

(86) PCT No.: PCT/US2020/038469
§ 371 (c)(1),
(2) Date: Dec. 17, 2021

(87) PCT Pub. No.: WO2020/257478
PCT Pub. Date: Dec. 24, 2020

(65) Prior Publication Data
US 2022/0315024 A1 Oct. 6, 2022

Related U.S. Application Data

(60) Provisional application No. 62/863,133, filed on Jun. 18, 2019.

(51) Int. Cl.
*B60W 50/10* (2012.01)
*B60W 40/09* (2012.01)

(52) U.S. Cl.
CPC ............ *B60W 50/10* (2013.01); *B60W 40/09* (2013.01); *B60W 2510/10* (2013.01);
(Continued)

(58) Field of Classification Search
CPC .. B60W 50/10; B60W 40/09; B60W 2510/10; B60W 2520/04; B60W 2520/06;
(Continued)

(56) References Cited

U.S. PATENT DOCUMENTS

2010/0010715 A1* 1/2010 Inoue .................. B60T 7/22
701/51
2010/0023234 A1 1/2010 Kameyama
(Continued)

FOREIGN PATENT DOCUMENTS

DE          10325184 A1    12/2004
DE      102010035978 A1     4/2011
(Continued)

OTHER PUBLICATIONS

International Search Report regarding PCT Application No. PCT/US2020/038469, dated Sep. 3, 2020.
(Continued)

*Primary Examiner* — Justin Holmes
(74) *Attorney, Agent, or Firm* — Arriver Software LLC

(57) ABSTRACT

A system for comparing driver intent and a gear setting of a vehicle comprises a driver monitoring system including at least one driver monitoring sensor configured to capture attributes of the driver indicative of driver intent regarding an intended direction of travel. The system also comprises an evaluation processor configured to access driver data from the driver monitoring system. The evaluation processor is also configured to generate a mismatch signal in response to determining a mismatch between the driver intent and a gear setting of the vehicle. The evaluation processor may also be configured to control braking and/or acceleration of the vehicle in response to determining a mismatch between the driver intent and a gear setting of the vehicle. The system may also use data regarding an object within a threshold
(Continued)

distance from a front or a rear of the vehicle, and/or a requested acceleration above a threshold amount.

15 Claims, 8 Drawing Sheets

(52) U.S. Cl.
CPC ..... *B60W 2520/04* (2013.01); *B60W 2520/06* (2013.01); *B60W 2520/105* (2013.01)

(58) Field of Classification Search
CPC ..... B60W 2520/105; B60W 30/18027; B60W 2050/143; B60W 50/14; B60W 2510/1005; B60W 2540/223; B60W 2540/225; B60W 40/08
See application file for complete search history.

(56) References Cited

U.S. PATENT DOCUMENTS

| | | |
|---|---|---|
| 2016/0107642 A1 | 4/2016 | Salgado et al. |
| 2017/0267244 A1 | 9/2017 | Kim |
| 2018/0341327 A1 | 11/2018 | Wuergler et al. |
| 2019/0176819 A1* | 6/2019 | Wolf .................. B60R 1/00 |

FOREIGN PATENT DOCUMENTS

| | | |
|---|---|---|
| DE | 102013223865 A1 | 5/2015 |
| DE | 102017204221 A1 | 9/2018 |

OTHER PUBLICATIONS

Supplementary European Search Report—EP20826574—Search Authority—Munich—dated Jun. 5, 2023.

* cited by examiner

SYSTEM MATCHING DRIVER INTENT WITH FORWARD-REVERSE GEAR SETTING

CROSS-REFERENCE TO RELATED APPLICATION

The present application claims the benefit of and priority to PCT International Patent Application Serial No. PCT/US2020/038469 filed Jun. 18, 2020 entitled "METHOD TO DETECT DRIVER READINESS FOR VEHICLE TAKE-OVER REQUESTS" which claims the benefit of and priority to U.S. Provisional Application No. 62/863,133, filed Jun. 18, 2019, the disclosure of which is hereby incorporated herein by reference in its entirety.

BACKGROUND

Field of the Invention

The present application generally relates to a system for determining vehicle reaction in response to attributes of a driver is provided.

SUMMARY

A system for comparing driver intent and a gear setting of a vehicle is provided. The system comprises a driver monitoring system including at least one driver monitoring sensor configured to capture attributes of the driver indicative of driver intent regarding an intended direction of travel. The system also comprises an evaluation processor configured to access driver data from the driver monitoring system. The evaluation processor is also configured to generate a mismatch signal in response to determining a mismatch between the driver intent and a gear setting of the vehicle.

According to an aspect of the disclosure, a system for comparing driver intent and a gear setting of a vehicle is provided. The system comprises a driver monitoring system including at least one driver monitoring sensor configured to capture attributes of the driver indicative of driver intent regarding an intended direction of travel. The system also comprises an evaluation processor configured to access driver data from the driver monitoring system. The evaluation processor is also configured to control braking or acceleration of the vehicle in response to determining a mismatch between the driver intent and a gear setting of the vehicle.

Further objects, features, and advantages of this application will become readily apparent to persons skilled in the art after a review of the following description, with reference to the drawings and claims that are appended to and form a part of this specification.

DETAILED DESCRIPTION

This disclosure describes a system and method to prevent collisions caused by mix-up of gas-brake pedals or forward-reverse gears. The system may be configured to determine driver's intention and act accordingly to ensure only that action occurs. The system may determine intention of the driver by a driver monitoring system. The driver monitoring system may be configured to determine if the driver is looking in rear view mirror and/or if the driver turned around and/or if the driver is looking forward. The system may determine intention at least partly by an acceleration sensor. The system may determine if a collision occurred and may utilize low G and high G satellite sensors. The system may stop the collision from worsening or continuing by an inadvertent gas pedal press. Further the system may determine driver intention by peripheral outward looking sensors (LIDAR, radar, ultrasonic, etc.). Using these sensors the driver may determine directions that would cause an (almost immediate) collision given driver inputs. The system may determine driver intention by a trailer sensor. For example, the system may decide to not stop driver from backing towards an object behind them if a trailer is attached or if trailer assist mode is activated.

In response, to the driver intent the system may take particular actions. The actions may include providing a visual, auditor, tactile, etc. warning, applying brakes to prevent collision, not allowing gas to be applied in a manner that would cause a collision, not allowing gas to be applied after collision occurs, not allowing the driver to move vehicle if driver intention and potential vehicle trajectory do not match.

The system may take initiate driver monitoring and control of braking or acceleration at certain times during a drive. For example, monitoring and control may be initiated at or around vehicle startup, at or around stop and go traffic scenario, when vehicle has been idle then begins to move, during low speed transition periods, and through speed or throttle limited map locations (parking lots, etc.) for example based on GPS data.

Figure 1:
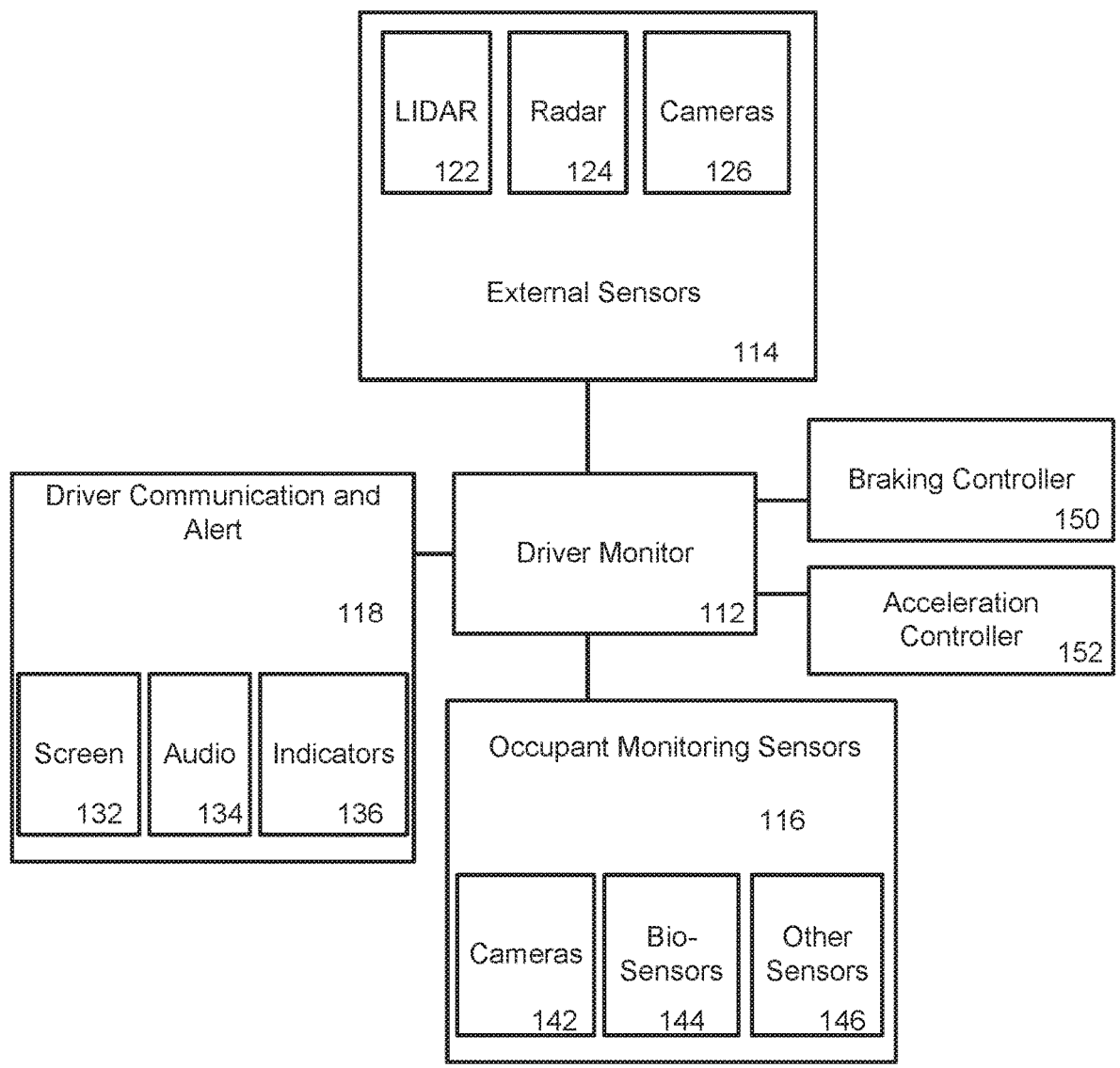
FIG. 1 is a schematic diagram for a driver monitor.

FIG. 1 is a schematic view of a driver monitor 112. The driver monitor may determine a driver profile and driver baseline as described elsewhere in this application. In accomplishing these tasks, the driver monitor 112 may be in communication with external sensors 114. The external sensors may monitor the environment surrounding the vehicle as the vehicle is stopped or as the vehicle proceeds along its route. The external sensors may include Lidar 122, radar 124, and cameras 126. However, it is understood that other external sensing technologies may be used, for example, ultrasonic sensors or other distance or environmental measuring sensors within the vehicle. In some examples, the sensors may include temperature sensors, moisture sensors, as well as, various features that may be derived from sensors such as the camera. These features may include whether there is a snowy condition, the amount of glare from the sun, or other external environmental conditions. The driver monitor system 112 may use input from the external sensors 114 to provide environmental context to the driver monitor 112 when determining the vehicle profile and/or baseline. The driver monitor 112 may also be in communication with an occupant monitoring sensors system 116. The occupant monitoring system 116 may include cameras 142, biosensors 144, as well as other sensors 146. The cameras may be mounted in different positions, orientations, or directions within the vehicle to provide different viewpoints of occupants in the vehicle. The cameras may be used to analyze gestures by the occupants or determine the position and/or orientation of the occupant, or monitor indications of the occupant such as facial features indicative of emotion or condition. The biosensors 144 may include touch sensors for example, to determine if the driver is touching a certain control such as the steering wheel or gear shift. The biosensors 144 could include a heart rate monitor to determine the heart rate of the passenger, as well as, other biological indications such as temperature or skin moisture. In addition, other sensors 146 may be used such as presence, absence or position sensors to determine for example, if the occupant is wearing a safety belt, a weight sensor to determine the weight of the occupant. The driver monitor 112 may use the occupant monitoring data from the occupant monitoring sensor systems to determine the driver profile and/or baseline.

The driver monitor 112 may also be in communication with a driver communication and alert system 118. The driver communication and alert system 118 may include video screens 132, audio system 134, as well as other indicators 136. The screen may be a screen in the console and may be part of the instrument cluster, or a part of a vehicle infotainment system. The audio may be integrated into the vehicle infotainment system or a separate audio feature for example, as part of the navigation or telecommunication systems. The audio may provide noises such as beeps, chirps or chimes or may provide language prompts for example, asking questions or providing statements in an automated or pre-recorded voice. The driver communication and alert system 118 may also include other indicators for example, lamps or LEDs to provide a visual indication or stimulation either on the instrument cluster or elsewhere in the vehicle including for example, on the side view mirrors or rear view mirror.

The driver monitor 112 may also be in communication with a brake controller 150 to control breaking in response to the driver intent. The driver monitor may also be in communication with an acceleration controller 152 to control acceleration of the vehicle. The acceleration controller 152 may be in communication with or be part of an engine controller.

Figure 2:
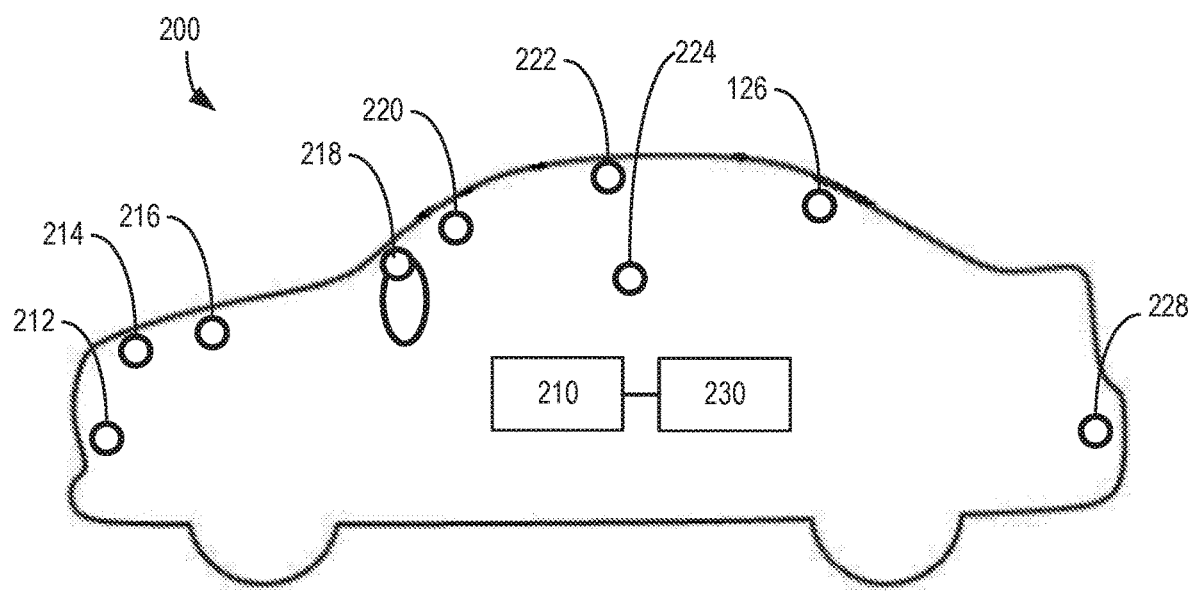
FIG. 2 is a schematic diagram of a vehicle with sensors for monitoring the driver and outside environmental attributes.

Now referring to FIG. 2, a schematic view of the vehicle 200 is provided. The vehicle may include a sensor processer 210. The sensor processer 210 may include one or more processors to monitor and/or measure the input from various vehicle sensors both inside or outside of the vehicle. For example, as described previously, the vehicle may include a range sensor 212, for example, an ultrasonic sensor to determine if an object is directly from another vehicle 200. The vehicle may include a radar sensor 214. The radar sensor 214 may be a forward looking radar sensor and provide distance and location information of objects that are located within the radar sensing field. As such, a vehicle may include a forward facing radar shown as radar 214. However, a rearward or sideward looking radar may also be included. The system may include a Lidar 216. The Lidar 216 may provide distance and location information for vehicles that are within the sensing field of the Lidar system. As such, the vehicle may include a forward looking Lidar system as shown with regard to Lidar 216. However, rearward or sideward looking Lidar systems may also be provided.

The vehicle 200 may also include biosensors 218. The biosensor 218 may for example, be integrated into a steering wheel of the vehicle. However, other implementations may include integration into seats and/or a seatbelt or within other vehicle controls such as the gear shift or other control knobs. Biosensor 218 may determine a heartbeat, temperature, and/or moisture of the skin of the driver of the vehicle. As such, the condition of the driver may be evaluated by measuring various biosensor readings as provided by the biosensor 218. The system may also have one or more inward or cabin facing cameras 220. The cabin facing cameras 220 may include cameras that operate in the white light spectrum, infrared spectrum, or other available wavelengths. The cameras may be used to determine various gestures of the driver, position or orientation of the driver, or facial expressions of the driver to provide information about the condition of the driver (e.g. emotional state, engagement, drowsiness and impairment of the driver). Further, bioanalysis may be applied to the images from the camera to determine the condition of the driver or if the driver has experienced some symptoms of some medical state. For example, if the driver's eyes are dilated, this may be indicative of a potential medical condition which could be taken into account in controlling the vehicle. As, such, condition of the driver may be determined based on a combination of measurements from one or more sensors. For example, a heart rate in a certain range, a particular facial expression, and skin coloring within a certain range may correspond to a particular emotional state, engagement, drowsiness and/or impairment of the driver.

Cameras 222 may be used to view the external road conditions, such as in front of, behind, or to the side of the vehicle. This may be used to determine the path of the road in front of the vehicle, the lane indications on the road, the condition of the road with regard to road surface, or with regard to the environment external to the vehicle including whether the vehicle is in a rain or snow environment, as well as, lighting conditions external to the vehicle including whether there is glare or glint from the sun or other objects surrounding the vehicle as well as the lack of light due to poor road lighting infrastructure. As discussed previously, the vehicle may include rearward or sideward looking implementations of any of the previously mentioned sensors. As such, a side view mirror sensor 224 may be attached to the side view mirror of the vehicle and may include a radar, Lidar and/or camera sensor for determining external conditions relative to the vehicle including the position of objects such as other vehicles around the instant vehicle. Additionally, rearward facing camera 226 and ultrasonic sensor 228 in the rear bumper of the vehicle provide other exemplary implementations of rearward facing sensors that parallel the functionality of the forward facing sensors described previously.

The vehicle may also include an evaluation processor 230 configured to generate a mismatch signal in response to determining a mismatch between the driver intent and a gear setting of the vehicle, such as a forward or a reverse setting. For example, the evaluation processor 230 may generate the mismatch signal in response to determining the vehicle being in a forward gear setting while the driver intent is indicative of an intention to drive in reverse (e.g. the driver looking toward the rear of the vehicle or watching one or more of the rearview mirrors). In another example, the evaluation processor 230 may generate the mismatch signal in response to determining the vehicle being in a reverse gear setting while the driver intent is indicative of an intention to drive in a forward (e.g. the driver looking straight forward).

The evaluation processor 230 may be configured to access driver data from a driver monitoring system including at least one driver monitoring sensor configured to capture attributes of the driver indicative of driver intent regarding an intended direction of travel. For example, the evaluation processor 230 may be in functional communication with the sensor processer 210, which may form a part of the driver monitoring system. In another example, the evaluation processor 230 may be in functional communication with the occupant monitoring system 116 in order to determine the position, orientation, and gaze direction of the driver. In other words, the occupant monitoring system 116 may function as the driver monitoring system with one or more cameras or other sensors capturing the attributes of the driver indicative of driver intent regarding an intended direction of travel. The driver attributes indicative of driver intent for the intended direction of travel may include, for example, a driver gaze forward or toward a mirror or a rearview camera display. The driver attributes indicative of driver intent for the intended direction of travel may also include the driver's body or head position being directed forward or turned-around toward the rear of the vehicle. The driver attributes indicative of driver intent for the intended direction of travel may also include positioning of the driver's hands on the steering wheel. In some embodiments, the evaluation processor 230 may be a stand-alone unit. In some other embodiments, the evaluation processor 230 may be implemented integrally with one or more other processors, such as the sensor processer 210.

In some embodiments, the evaluation processor 230 may require one or more additional signals in addition to determining a mismatch between the driver intent and the gear setting of the vehicle before the mismatch signal is generated. For example, the evaluation processor may generate the mismatch signal only if an object is detected in proximity to a front or a rear of the vehicle. Additionally or alternatively, the evaluation processor may generate the mismatch signal only when the driver requests acceleration above a threshold acceleration amount.

The mismatch signal may be used by one or more systems and/or controllers within the vehicle for one or more different purposes. For example, an alert, such as an audio, haptic, and/or visual alert may be generated by an infotainment system and/or by another user interface in response to the mismatch signal. In some embodiments, a powertrain control module (PCM) may limit or prevent application of an accelerator control in response to receiving the mismatch signal. In some embodiments, a brake controller may apply the vehicle brakes in response to receiving the mismatch signal. In some embodiments, one or more vehicle controls may be restricted to operate in a limited capacity in response to the mismatch signal. For example, a speed or a throttle control of the vehicle may be limited to a corresponding predetermined value while the mismatch signal is present. In some embodiments, the evaluation processor 230 may be configured to provide an alert to the driver in response to determining the mismatch between the driver intent and the gear setting of the vehicle. In some embodiments, the mismatch signal may be provided to change or limit the throttle and/or braking operation only after an alert is provided and with the driver not taking corrective action to eliminate the mismatch between the driver intent and the gear setting of the vehicle.

In some embodiments, the evaluation processor 230 may be configured to end the evaluation of the driver intent after the vehicle has surpassed a threshold speed for a threshold amount of time. This can prevent false alerts that could otherwise result, for example, in response to a driver watching a rearview mirror while driving down a highway.

Figure 3:
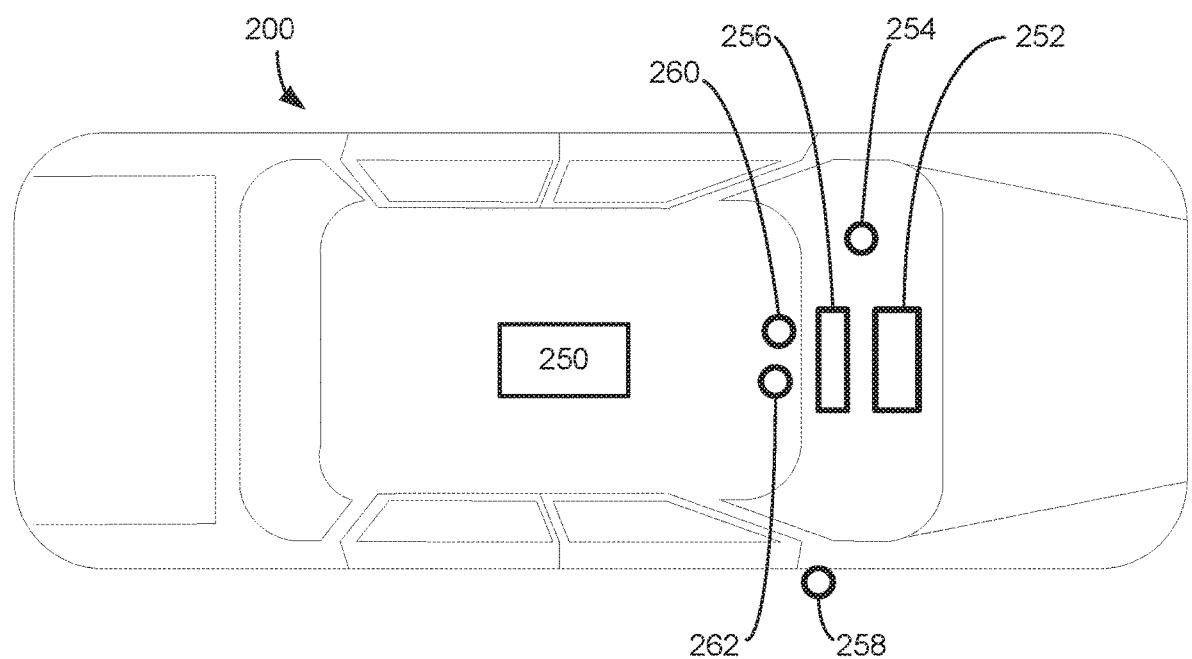
FIG. 3 is a schematic diagram of a vehicle illustrating a communication and alert system.

With regard to FIG. 3, the vehicle 200 may include a vehicle communication and alert processor 250. The vehicle communication and alert processor 250 include one or more processors and may be in communication with various communication devices such as screens, audio, as well as, other indicators within the vehicle to alert and/or communicate certain items of information with the occupant of the vehicle. The vehicle may include a video display 252 that may be part of the instrument cluster or part of the vehicle entertainment system. An indicator 254 which may also be part of the instrument cluster or may take the form of a heads-up or windshield projector indicator. In addition, the system may provide stimulus to the occupant through an indicator on the rearview mirror 256 or the side mirror 258. Further, communication may be provided between the system and the occupant through audio. For example, a speaker 260 and a microphone 262 may provide sound indicators or verbal communication between the occupant and the system 250.

Figure 4:
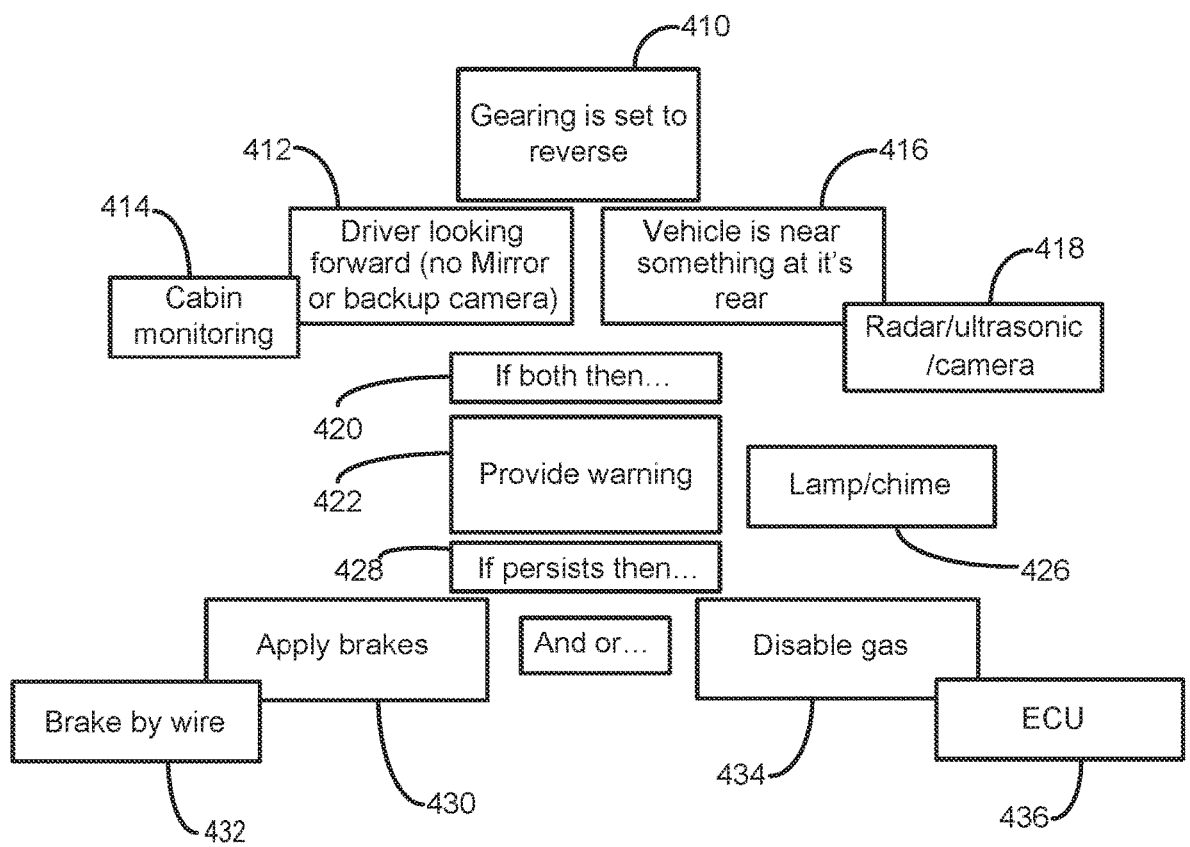
FIG. 4 is a schematic diagram illustrating a method to determine if the driver intent is to go forward but the gearing is set to move in reverse.

FIG. 4 is a schematic diagram illustrating a method to determine if the driver intent is to go forward but the gearing is set to move in reverse. This routine may activate at start-up and may persist until the vehicle has surpassed a threshold speed for a threshold period of time. The threshold speed may be five miles per hour and the threshold time may for example, be ten seconds. In block 410, the vehicle determines if the gearing is set to reverse in block 412. The system determines if the driver is looking forward (which may include not looking at the mirror or the back-up camera). Determining if the driver is looking forward may be performed by a driver monitoring system 414 as described elsewhere in this application. In block 416, the system may determine if an object is near to the rear of the vehicle. The system may determine if an object is near to the rear of the vehicle through an external monitoring system for example, in block 418 which may use for example, radar, ultrasonic sensors, camera, or LIDAR. If in block 420, the system determines that the driver is looking forward, there is an object near the rear of the vehicle, and the gear is set to reverse then the system may provide a warning in block 422. The warning may be provided by an occupant communication and alert system 426 which may for example use a lamp, or a chime. In some implementations, a verbal warning may be given through a text of speech component of the communication system. In block 428, the system determines if the three conditions continue to persist. If the three conditions continue to persist, the system may apply the brakes 430 for example, through a braking control system 432 in addition to or separately the system may disable the gas as denoted by block 434. The gas may be disabled by a power controller 436, which may be in communication with or part of the engine control unit.

Figure 5:
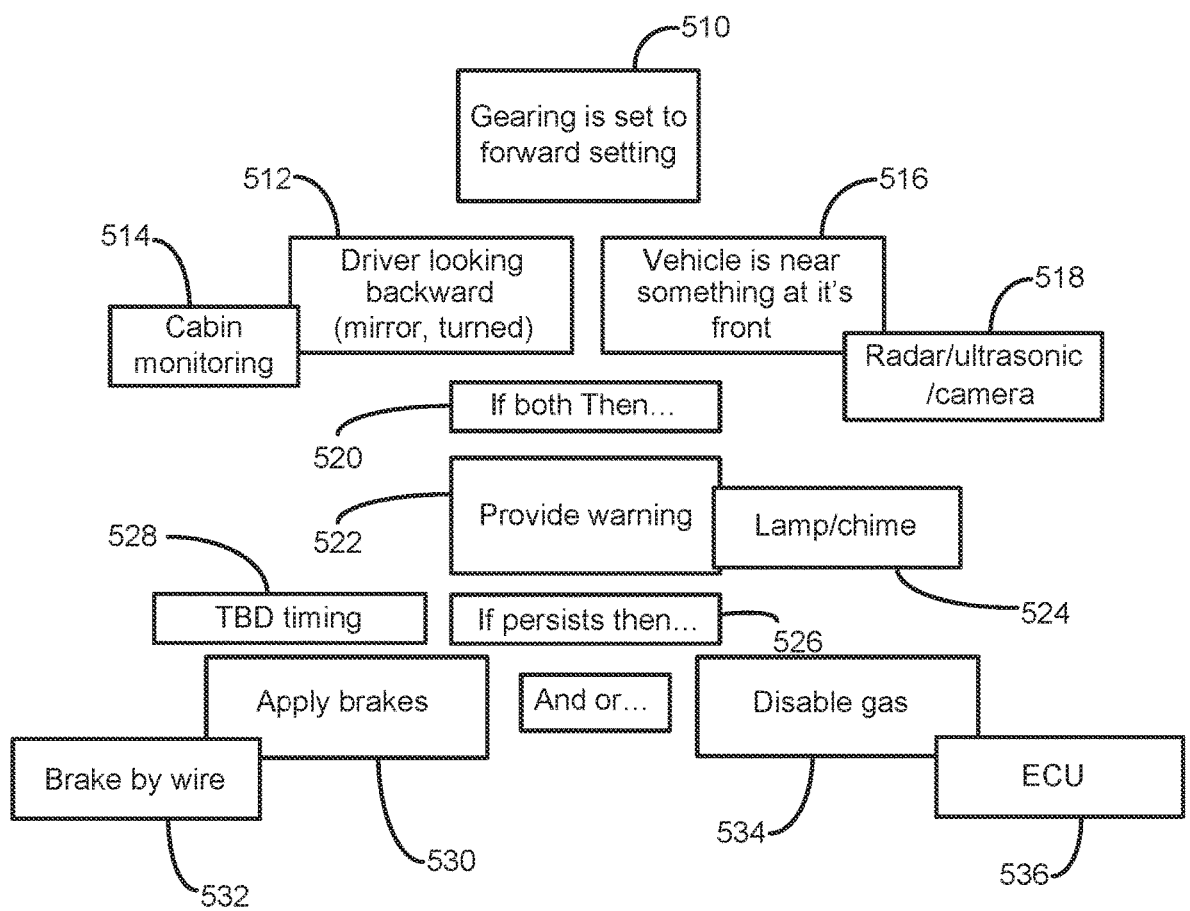
FIG. 5 is a schematic view of a method for determining when the driver intent is to move the vehicle backward but the gearing is set to drive.

FIG. 5 is a schematic view of a method for determining when the driver intent is to move the vehicle backward but the gearing is set to a forward gear setting. This method may activate at start-up of the vehicle and may persist until the vehicle has surpassed a threshold speed for a threshold time period. The threshold speed may be five miles per hour and for example, the threshold time period may be ten seconds. In block 510, the system determines if the gearing is set to a drive gear. In block 512, the system determines whether the driver is looking backwards, which may include the driver having his head turned to the rear, or the driver is looking at the rear view or one of the side view mirrors. The system may determine if the driver is looking backward through the cab driver monitoring system as denoted by reference 516. The system may also determine if an object is near the front of the vehicle in block 514. The system may utilize an external sensor system denoted by reference number 518 to determine if an object is near to the front of the vehicle. The external sensor system may use radar, ultrasonic sensors, cameras, LIDAR, or other sensing techniques. In block 520, the system determines if the driver is looking backward, if an object is near the front of the vehicle, and if the gearing is set to a drive gear. If all three events are occurring in block 520, then the system may provide a warning in block 522. The warning may be provided by a driver communication and alert system denoted by block 524. A driver communication alert system 524 may utilize an indicator lamp, a chime, or other communication methods as described throughout this application to provide the warning. In block 526, if all three conditions persist for example, for a threshold period of time as denoted by block 528, then the vehicle may apply the brakes 530 using the brake controller as denoted by reference number 532. In addition, or separately, the system may disable the gas as denoted in block 534. The gas may be disabled by a power control unit which may be in communication or part of the power control unit as denoted by reference number 536.

Figure 6:
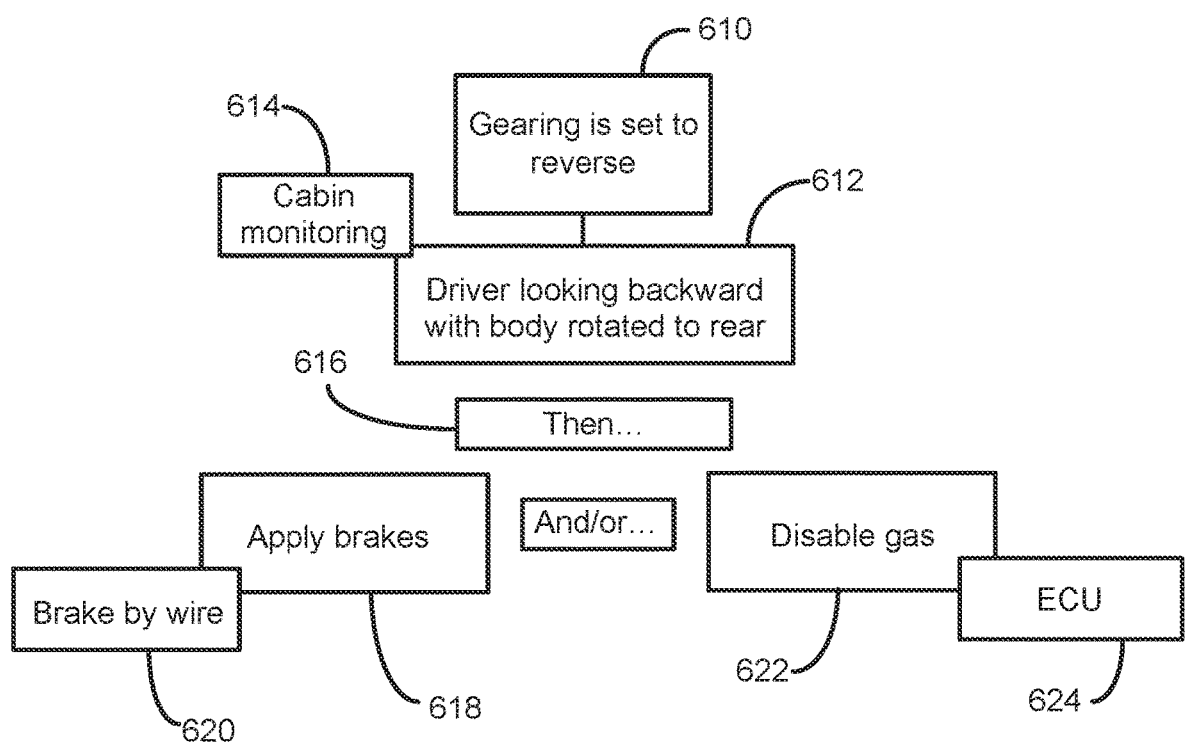
FIG. 6 is a schematic view of a method for determining if the user driver's intent is to move the vehicle backward but the gearing of the vehicle is set to a drive gear.

FIG. 6 is a schematic view of a method for determining if the user driver's intent is to move the vehicle backward but the gearing of the vehicle is set to a drive gear. This method may be activated at start-up and may persist until the vehicle has surpassed a threshold speed for a threshold period of time. The threshold speed may be five miles per hour and the threshold time period may for example, be ten seconds. In block 610, the system determines if the gearing is set to a drive gear. In block 612, the system determines if the driver is looking backward with their body rotated to the rear of the vehicle. The system may determine if the driver's body is rotated to the rear of the vehicle through a driver monitoring system 614. The driver monitoring system 614 may use various sensors as described throughout for example, a camera which may determine the position or orientation of the body of the driver to determine if the body is turned to the rear of the vehicle. In block 616, the system determines if the driver's body is turned to the rear of the vehicle and the gearing is set to a drive gear. If both conditions are met, the system may generate the mismatch signal. The system may then apply the brakes of the vehicle in block 618. The system may apply the brakes through a brake control system as denoted by block 620. In addition to or separately, the system may signal the gas in block 622. The gas may be disabled through a power controller as denoted by block 624.

Figure 7:
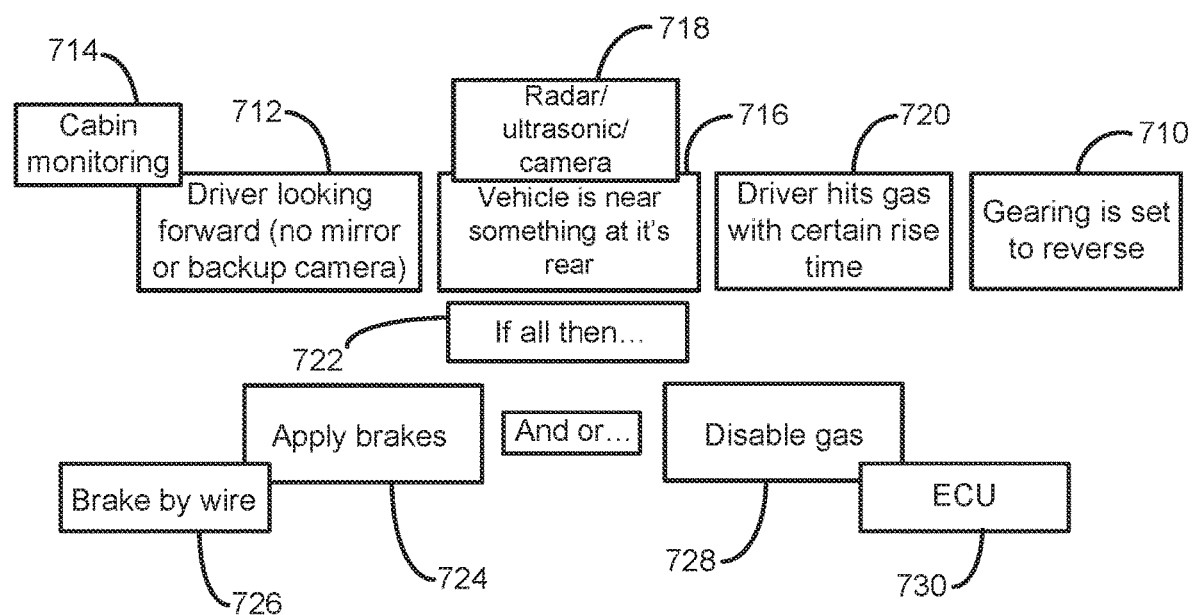
FIG. 7 is a schematic view of the method for determining if the driver intent is to move forward with the gearing set to reverse and the driver intent is to slow down but instead the accelerator pedal is pressed.

FIG. 7 is a schematic view of the method for determining if the driver intent is to move forward with the gearing set to reverse and the driver intent is to slow down but instead the accelerator pedal is pressed. This routine may activate at start-up and may persist until the vehicle has surpassed a threshold speed or a threshold period of time. The threshold speed may be five miles per hour and the threshold period of time may for example be ten seconds. In block 710, the vehicle may determine if the gearing of the vehicle is set to reverse. In block 712, the system may determine if the driver is looking forward (this may include the driver not looking at a mirror or at a back-up camera). The system may determine if the driver is looking forward through a driver monitoring system 714 as described elsewhere in this application. In block 716, the system may determine if an object is near the rear of the vehicle. The system may determine if an object is near the rear of the vehicle through an external monitoring system as denoted by block 718. The external monitoring system 718 may include a radar, ultrasonic sensors, camera, LIDAR or other numerous sensing techniques. In block 720, the system determines if the driver hits the gas pedal with a certain rise time. In block 722, if all four conditions are met (e.g., the gearing is set to reverse, the driver is looking forward, the vehicle as an object near the rear of the vehicle, and the driver hits the gas with a certain rise time), then the vehicle may apply the brakes as denoted by block 724. The system may apply the brakes through a brake controller system as denoted by block 726. In addition or separately, the system may disable the gas in block 728. The gas needing to be disabled through a power controller denoted by block 730 which may be in communication with the engine control unit.

Figure 8:
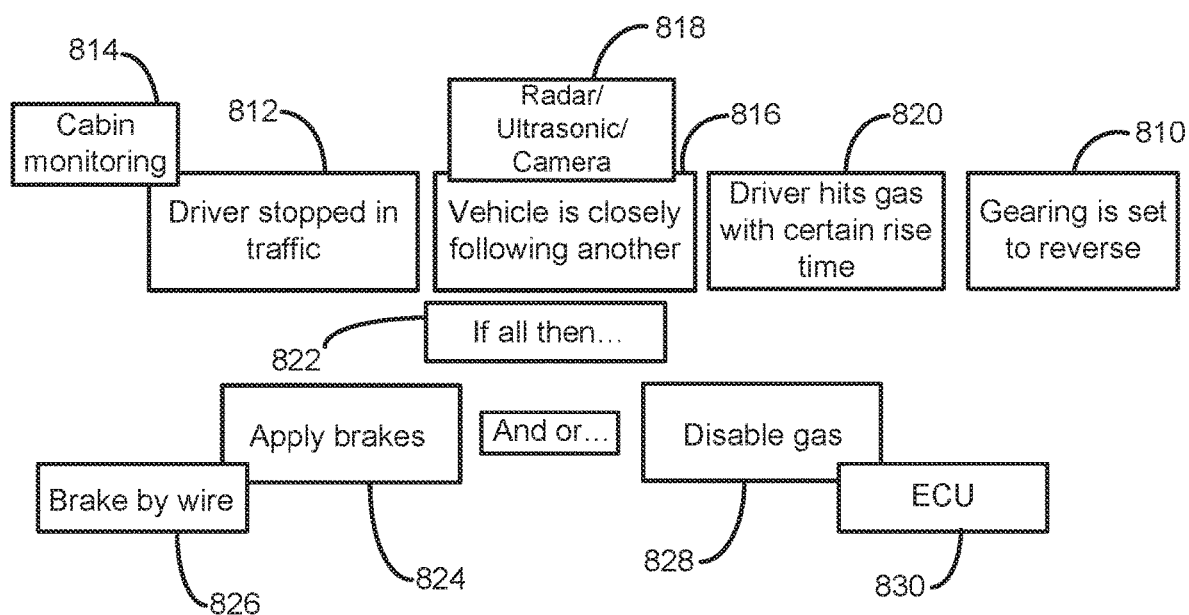
FIG. 8 is a schematic view of a method for determining if the driver intent is to slow down but instead the driver hits the gas pedal.

FIG. 8 is a schematic view of a method for determining if the driver intent is to slow down but instead the driver hits the gas pedal. This may be a common occurrence and cause accidents in stop-and-go-type traffic. This routine may become active when the vehicle goes below a threshold speed for a threshold period of time. The threshold speed may be five miles per hour and the threshold period of time may be for example, five seconds. Further, this method may be stopped when the vehicle has exceeded a threshold speed for a threshold period of time. The threshold speed may for example, be twenty miles per hour and the threshold period of time may for example, be ten seconds. In block 812, the system determines if the driver is stopped in traffic. The system may determine if the driver is stopped in traffic through the camera monitoring system 814. In block 816, the system determines if a vehicle is closely following another vehicle. The system then determines if the vehicle is closer to following another vehicle through an external sensor system as denoted by block 818. The external sensor system may include a radar, ultrasonic sensors, camera, LIDAR, or other sensing means as described throughout this application. In block 820, the system determines if the driver hits the gas with a certain rise time. If all three conditions are met in block 822, (the driver is stopped in traffic, the vehicle is closely following another vehicle, and the driver hits the gas with a certain rise time), then the vehicle may apply the brakes as denoted by block 824. The brakes may be applied through a brake control system as denoted by block 826. In addition or separately, the system may disable the gas in block 828. The gas may be disabled through a power control system 830, which may for example, be connected to or part of an engine control unit.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

The invention claimed is:

1. A system for comparing driver intent and a gear setting of a vehicle, the system comprising:
   a driver monitoring system including at least one driver monitoring sensor configured to capture attributes of the driver indicative of driver intent regarding an intended direction of travel;
   an external sensor; and
   an evaluation processor configured to access driver data from the driver monitoring system, and to generate a mismatch signal in response to determining a mismatch between the driver intent and a gear setting of the vehicle, wherein the evaluation processor is configured to determine the driver intent as going backward by determining that the driver is looking towards a mirror or rearview camera display, and wherein the evaluation processor is configured to determine that an object is within a threshold distance from a front of the vehicle based on the external sensor.

2. The system of claim 1, wherein the evaluation processor is configured to begin evaluation of the driver intent during vehicle startup.

3. The system of claim 1, wherein the evaluation processor is configured to end the evaluation of the driver intent after the vehicle has surpassed a threshold speed for a threshold amount of time.

4. The system of claim 1, wherein the gear setting of the vehicle is in a forward gear.

5. The system of claim 1, wherein the evaluation processor is configured to generate the mismatch signal in response to determining that the object is within the threshold distance from the front of the vehicle.

6. The system of claim 5, wherein the evaluation processor is configured to provide an alert to the driver in response to determining that the object is within the threshold distance from the front of the vehicle.

7. The system of claim 1, wherein the evaluation processor is further configured to initiate an action in response to determining the mismatch between the driver intent and the gear setting of the vehicle, the action including at least one of applying a brake or limiting application of an accelerator control.

8. A system for comparing driver intent and a gear setting of a vehicle, the system comprising:
   a driver monitoring system including at least one driver monitoring sensor configured to capture attributes of the driver indicative of driver intent regarding an intended direction of travel;
   an external sensor; and
   an evaluation processor configured to access driver data from the driver monitoring system, and to generate a mismatch signal in response to the driver requesting acceleration above a threshold acceleration and determining a mismatch between the driver intent and a reverse gear setting of the vehicle, wherein the evaluation processor is configured to determine the driver intent as going forward by determining a direction that the driver is looking, and wherein the evaluation processor is configured to determine that an object is within a threshold distance from a rear of the vehicle based on the external sensor.

9. The system of claim 8, wherein the evaluation processor is configured to generate the mismatch signal in response to determining that the object is within the threshold distance from the rear of the vehicle.

10. The system of claim 9, wherein the evaluation processor is configured to provide an alert to the driver in response to determining that the object is within the threshold distance from the rear of the vehicle.

11. A system for comparing driver intent and a gear setting of a vehicle, the system comprising:
    a driver monitoring system including at least one driver monitoring sensor configured to capture attributes of the driver indicative of driver intent regarding an intended direction of travel;
    an evaluation processor configured to access driver data from the driver monitoring system, and to control braking or acceleration in response to determining a mismatch between the driver intent and a gear setting of the vehicle, wherein the evaluation processor is configured to determine the mismatch between the driver intent and the gear setting of the vehicle in response to the driver intent, an object within a threshold distance from a front of the vehicle, and the driver requesting acceleration above a threshold acceleration.

12. The system of claim 11, wherein the evaluation processor is configured to begin evaluation of the driver intent when the vehicle goes below a threshold speed for a threshold amount of time.

13. The system of claim 11, wherein the evaluation processor is configured to end the evaluation of the driver intent after the vehicle has surpassed a threshold speed for a threshold amount of time.

14. The system of claim 11, wherein the evaluation processor is configured to determine the driver intent by determining a direction that the driver is looking.

15. The system of claim 11, wherein the evaluation processor is further configured to initiate an action in response to determining the mismatch between the driver intent and the gear setting of the vehicle, the action including at least one of applying a brake or limiting application of an accelerator control.

* * * * *